(12) United States Patent
Lundeen

(10) Patent No.: US 9,065,171 B2
(45) Date of Patent: Jun. 23, 2015

(54) ANTENNA SUPPORT BRACKET

(75) Inventor: Eric John Lundeen, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 1118 days.

(21) Appl. No.: 12/899,111

(22) Filed: Oct. 6, 2010

(65) Prior Publication Data

US 2012/0086613 A1  Apr. 12, 2012

(51) Int. Cl.
*H01Q 1/28* (2006.01)
*H01Q 1/12* (2006.01)
*B64C 1/36* (2006.01)

(52) U.S. Cl.
CPC ............ *H01Q 1/1214* (2013.01); *H01Q 1/286* (2013.01); *Y10T 29/49826* (2015.01); *B64C 1/36* (2013.01); *H01Q 1/28* (2013.01)

(58) Field of Classification Search
CPC ........... H01Q 1/28; H01Q 1/286; H01Q 1/32; H01Q 1/3275; H01Q 1/1214; B64C 1/36
USPC ............... 343/705, 885, 892, 703; 248/205.1, 248/220.21
See application file for complete search history.

(56) References Cited

U.S. PATENT DOCUMENTS

| | | | |
|---|---|---|---|
| D286,288 S | 10/1986 | Skinner et al. | |
| 4,799,642 A | 1/1989 | Wright | |
| 5,392,053 A * | 2/1995 | Hirata et al. | 343/700 MS |
| 5,639,173 A * | 6/1997 | Eng | 403/59 |
| 6,229,497 B1 | 5/2001 | McCracken | |
| 7,295,165 B2 * | 11/2007 | Ferguson et al. | 343/705 |
| 7,385,560 B1 | 6/2008 | Maloratsky et al. | |
| 7,642,975 B2 * | 1/2010 | Brunks et al. | 343/705 |
| 7,960,674 B2 * | 6/2011 | Boursier et al. | 219/633 |
| 8,063,837 B1 * | 11/2011 | Jennings et al. | 343/705 |
| 2006/0238427 A1* | 10/2006 | Ferguson et al. | 343/705 |
| 2009/0231218 A1* | 9/2009 | Brunks et al. | 343/705 |

FOREIGN PATENT DOCUMENTS

FR     2933378 A1    1/2010

OTHER PUBLICATIONS

European Search Report dated Jan. 23, 2012 for applicant The Boeing Company, in reference to NAM/P118552EP00 for application No. 11183455.2-2220, pp. 9.

* cited by examiner

*Primary Examiner* — Dameon E Levi
*Assistant Examiner* — Jennifer F Hu
(74) *Attorney, Agent, or Firm* — Yee & Associates, P.C.

(57) ABSTRACT

A method and apparatus comprising a planar member and a number of support members. The planar member may be configured to be attached to an airframe of an aircraft. The number of support members may be configured to connect the number of antennas to the planar member.

14 Claims, 7 Drawing Sheets

ANTENNA SUPPORT BRACKET

BACKGROUND INFORMATION

1. Field

The present disclosure relates generally to aircraft radomes and more particularly to radome attachment plates. Still more particularly, the present disclosure provides a method and system for associating an antenna with an aircraft.

2. Background

An antenna is a transducer that may transmit or receive electromagnetic waves. In other words, antennas may convert electromagnetic radiation into electrical current, or vice versa. Antennas may be used in systems such as radio and television broadcasting, point-to-point radio communication, wireless local area networks, cell phones, radar, aircraft communication, and spacecraft communication. Antennas may be employed in air or outer space, but can also be operated under water or through soil and rock.

When used on an aircraft, an antenna may be covered by a radome. A radome may be a structural, weatherproof enclosure that may protect a microwave and/or radar antenna. Radomes are transmissive to antenna radiation, radar, and radiowaves (microwaves). Radomes also may protect the antenna from the environment and may conceal antenna electronic equipment from view. Radomes may be constructed in several shapes depending upon the particular application. The shapes may include, for example, without limitation, spherical, geodesic, planar, and other shapes. When used on an aircraft the radome may also streamline the antenna system in a manner that may reduce drag on the aircraft.

The radome may be attached to an airframe of the aircraft by a radome attachment plate. The attachment of the antenna on the aircraft at an attachment point may result in forces and vibrations that may increase the need and expense for maintenance and further structural support.

Accordingly, it would be advantageous to have a method and apparatus, which takes into account one or more of the issues discussed above, as well as, possibly other issues.

SUMMARY

In one advantageous embodiment, an apparatus may comprise a planar member and a number of support members. The planar member may be configured to be attached to an airframe of an aircraft. The number of support members may be configured to connect the number of antennas and hold the number of antennas in the opening of the planar member.

In another advantageous embodiment, a system for associating a number of antennas with an aircraft may comprise an aircraft with an airframe, a planar member configured to be attached to an airframe of an aircraft, and a number of support members on the planar member. The number of support members may be configured to connect the number of antennas to the planar member.

In yet another advantageous embodiment, a method for associating a number of antennas with an aircraft may comprise a process. The process begins by attaching the planar member to the airframe of an aircraft. The planar member may have an opening configured to receive the number of antennas. The process also attaches a number of support members to the planar member near the opening of the planar member. The number of support members may be configured to connect the number of antennas to the planar member.

In yet another advantageous embodiment, an apparatus may comprise an aircraft with an airframe, a planar member configured to be attached to the airframe of the aircraft, a number of support members on the planar member, a number of connectors configured to attach the planar member to the airframe of the aircraft, and a number of antennas configured to receive and transmit signals. The planar member may have an opening configured to receive the number of antennas. The number of support members may be configured to connect the number of antennas to the planar member. The number of support members may be fastened to the planar member. The number of support members may be configured to reduce contact of the number of antennas to the airframe of the aircraft. The connectors may be configured to reduce a change in a shape of the planar member in response to a change in the shape of the airframe of the aircraft.

In yet another advantageous embodiment, a system for associating a number of antennas with an aircraft may comprise an aircraft with an airframe, a planar member configured to be attached to an airframe of an aircraft, a number of support members on the planar member, a number of connectors configured to attach the planar member to the airframe of the aircraft, and the number of antennas configured to receive and transmit signals. The planar member may have an opening configured to receive the number of antennas. The number of support members may be configured to connect the number, of antennas to the planar member. The number of support members may be fastened to the planar member. The number of support members may be configured to reduce the contact of the number of antennas to the airframe of the aircraft. The connectors may be configured to reduce a change in a shape of the planar member in response to a change in the shape of the airframe of the aircraft.

In yet another advantageous embodiment, a method for associating a number of antennas with an aircraft may comprise a process. The process begins by attaching the planar member to the airframe of an aircraft in which the planar member has an opening configured to receive the number of antennas. The process may also attach a number of support members to the planar member near the opening of the planar member. The number of support members may be configured to connect the number of antennas to the planar member. The number of support members may be configured to reduce contact of the number of antennas to the airframe of the aircraft. The process may also attach the planar member to the airframe of the aircraft using a number of connectors configured to reduce a change in a shape of the planar member in response to a change in a shape of the airframe of the aircraft. The process may also transmit and receive signals through the number of antennas.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
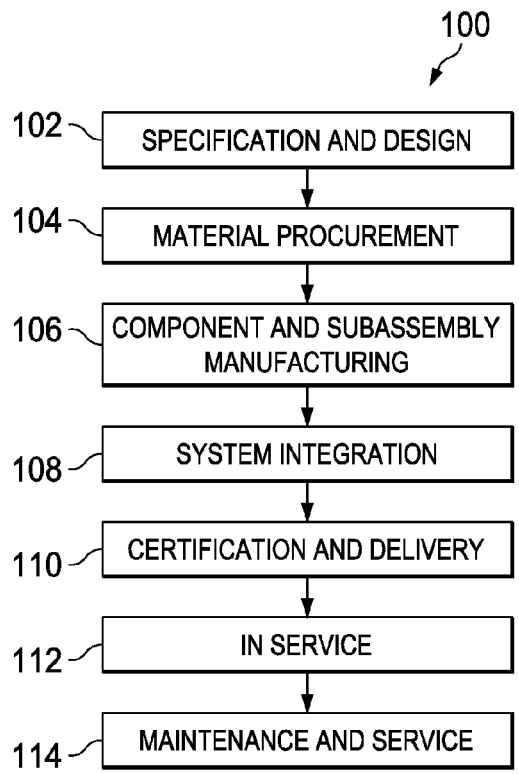
FIG. 1 is an illustration of an aircraft manufacturing and service method depicted in which an advantageous embodiment may be implemented.
Figure 2:
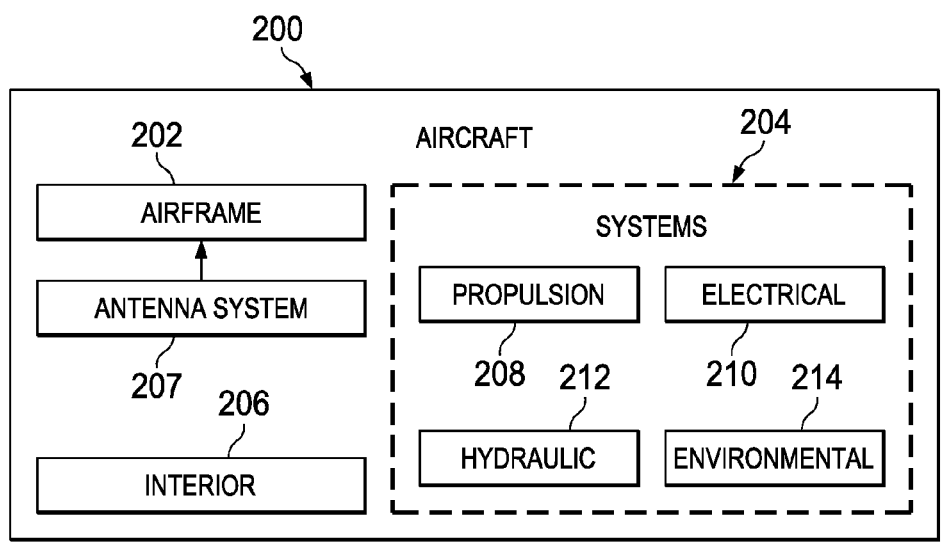
FIG. 2 is an illustration of an aircraft depicted in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204, interior 206, and antenna system 207. Antenna system 207 may be attached to airframe 202. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, without limitation, the different advantageous embodiments recognize and take into account that current antennas are attached to an airframe of an aircraft. Attaching the antenna to the airframe of the aircraft may create a hard point. A hard point may be a part of the aircraft airframe that may not expand and contract much with changing atmospheric pressures relative to other parts of the aircraft. Hard points may be reinforced which costs time, money, and weight.

Thus, the different advantageous embodiments provide a method and apparatus comprising a planar member and a number of support members. The planar member may be configured to be attached to an airframe of an aircraft. The number of support members may be attached to the planar member. The number of support members may be configured to connect a number of antennas to the planar member.

Figure 3:
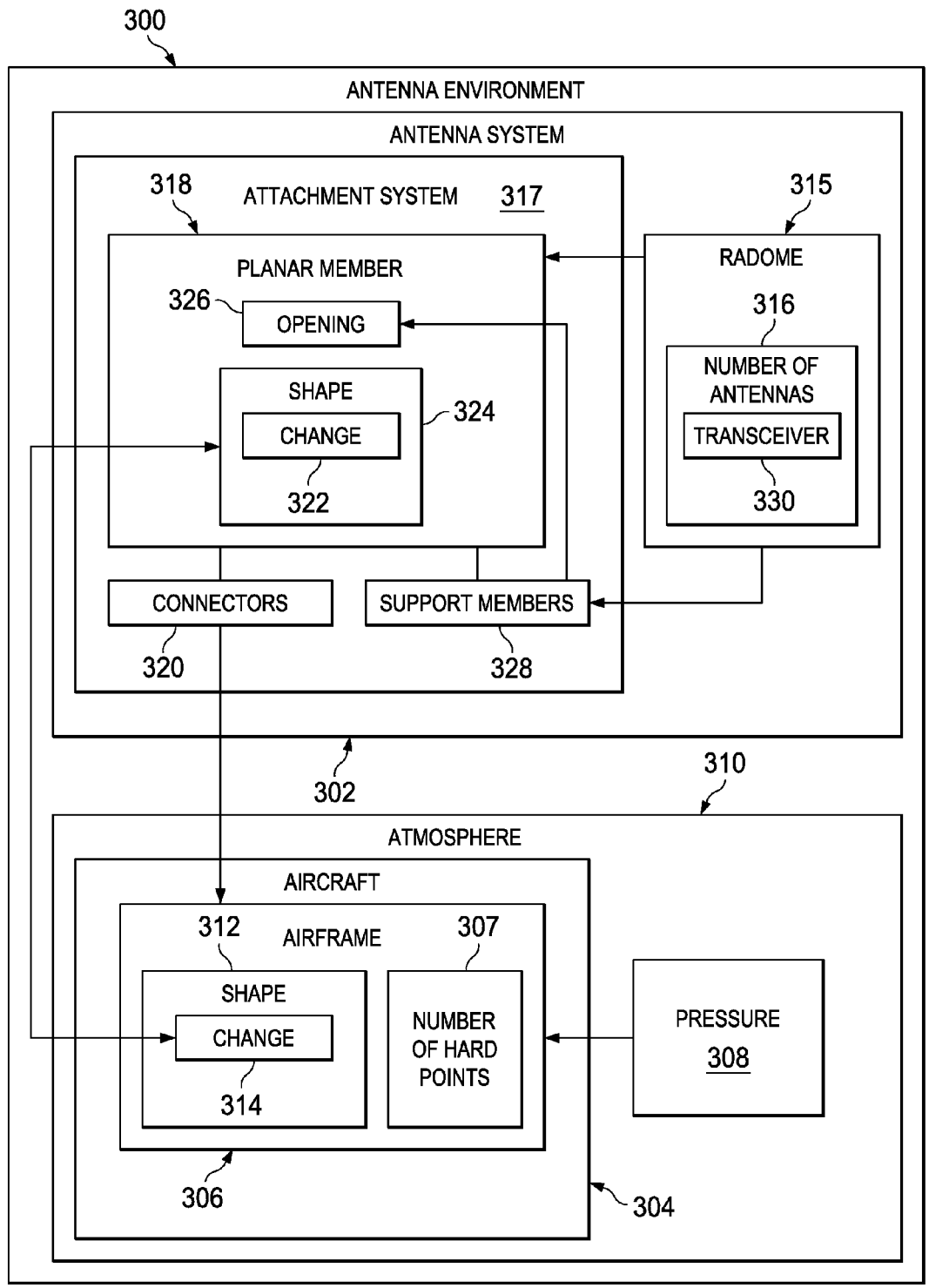
FIG. 3 is an illustration of a block diagram of an antenna environment depicted in accordance with an advantageous embodiment.

Turning to FIG. 3, a block diagram of an antenna environment is depicted in accordance with an advantageous embodiment. Antenna environment 300 may be implemented in a component such as aircraft 200 in FIG. 2, for example.

Antenna environment 300 may be any type of environment where an antenna is used. For example, antenna environment 300 may include antenna system 302 and aircraft 304. Antenna system 302 may be one example of an implementation of antenna system 207 in FIG. 2. Aircraft 304 may be an example of one implementation of aircraft 200 in FIG. 2. Antenna system may be used while in service 112 in FIG. 1.

Aircraft 304 may be a commercial aircraft, passenger aircraft, business aircraft, unmanned aircraft, or some other type of vehicle. Aircraft 304 may comprise airframe 306. In this illustrative example, airframe 306 may be the fuselage of aircraft 304. Airframe 306 may have an interior surface exposed to passengers and an exterior surface exposed to the atmosphere. Airframe 306 may have number of hard points 307. Number of hard points 307 may be locations on airframe 306 that are connected to other parts of aircraft 304.

In this illustrative example, airframe 306 may be affected by pressure 308 of atmosphere 310. Airframe 306 may expand and contract as pressure 308 changes. The cabin of aircraft 304 may be pressurized at an air pressure equal to that of the atmosphere around 6000 feet to around 8000 feet. When aircraft 304 is above 8000 feet, pressure 308 may be much lower than inside the cabin of aircraft 304. Shape 312 of airframe 306 may change 314 due to changes in pressure 308, loads from the weight of aircraft 304 during flight or taxi, thermal conditions, some other type of condition that may cause change 314 in shape 312 of airframe 306, or a combination of conditions. For example, as aircraft 304 rises higher in atmosphere 310, pressure 308 exerted on airframe 306 may decrease. As pressure 308 in the exterior of airframe 306 decreases relative to the pressure interior of airframe 306, change 314 in shape 312 of airframe 306 may occur. Change 314 may be an expansion of shape 312. As pressure 308 in the exterior of airframe 306 increases relative to the pressure interior of airframe 306, change 314 may be a contraction of shape 312.

In this illustrative example, antenna system 302 may include radome 315, number of antennas 316, and attachment system 317. Radome 315 may be an enclosure that protects number of antennas 316. Radome 315 may be, for example, without limitation, spherical, geodesic, planar, and/or other shapes. Radome 315 may include planar member 318. Planar member 318 may also be referred to as a radome attachment plate. Planar member 318 may be attached to airframe 306 of aircraft 304 by connectors 320. Connectors 320 may be, for example, without limitation, swing links, bolts, welds, fasteners, and/or other suitable types of connector.

Swing links may prevent planar member 318 from expanding and/or contracting with airframe 306 beyond a desirable amount. The expansion and/or contraction may be caused by pressure 308.

For example, if airframe 306 expands, the part of swing links attached to airframe 306 may move with airframe 306. However, planar member 318 may not experience the forces because the swing links may move and/or absorb at least some movement of airframe 306. In one or more advantageous embodiments, connectors 320 may allow for change 322 in shape 324 of planar member 318 to be reduced by change 314 in shape 312 of airframe 306.

In this illustrative example, radome 315 may include opening 326. Opening 326 may be a middle area of planar member 318 that is exposed to airframe 306 of aircraft 304. Opening 326 may be configured to receive number of antennas 316. In different advantageous embodiments, planar member 318 may not have opening 326 and number of antennas 316 may be attached onto planar member 318 directly.

Opening 326 may be different shapes and sizes. For example, opening 326 may be, without limitation, an oval, a sphere, a square, a rectangle, a triangle, and other shapes. In an advantageous embodiment, opening 326 may be larger than number of antennas 316. In different advantageous embodiments, opening 326 may be of similar size or smaller than number of antennas 316.

In this illustrative example, planar member 318 also may include support members 328. In these advantageous embodiments, support members 328 may be brackets that are attached to planar member 318. Support members may be configured to attach to planar member 318 in, near, below, or above opening 326. Support members 328 may be configured to attach number of antennas 316 to planar member 318 in, near, below, or above opening 326. For example, in some illustrative examples, support members 328 may be located above opening 326 and configured to hold number of antennas 316 above opening 326. In different illustrative examples, support members 328 may be located in opening 326 and configured to hold number of antennas 316 in opening 326. In other illustrative examples, support members 328 may be located in opening 326 and configured to hold number of antennas 316 above opening 326. Support members 328 may be fastened, bolted, welded, or attached by some other device to planar member 318. In different advantageous embodiments, support members 328 may be part of planar member 318 and not attached to planar member 318.

Number of antennas 316 may be a device used to transmit and receive radar and radio waves. Number of antennas 316 may include transceiver 330. Transceiver 330 may be a component of number of antennas 316 and may transmit and receive radar and/or radio waves.

The different advantageous embodiments recognize and take into account that existing antenna attachment systems attach the antenna to hard points on the aircraft. The different advantageous embodiments may provide a reduction in the number of hard points on an aircraft. The antenna may not become a hard point because the antenna may be attached to the radome attachment plate and not the airframe of the aircraft. Reducing the number of hard points may reduce weight and complexity of the aircraft by reducing the reinforcements of the hard points. Reducing the number of hard points may also reduce the cost of the aircraft.

The illustration of antenna environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, support members 328 may be separate from planar member 318. In different advantageous embodiments, there may be multiple antennas connected to planar member 318. In different advantageous embodiments, there may be multiple antennas connected to multiple planar members.

Figure 4:
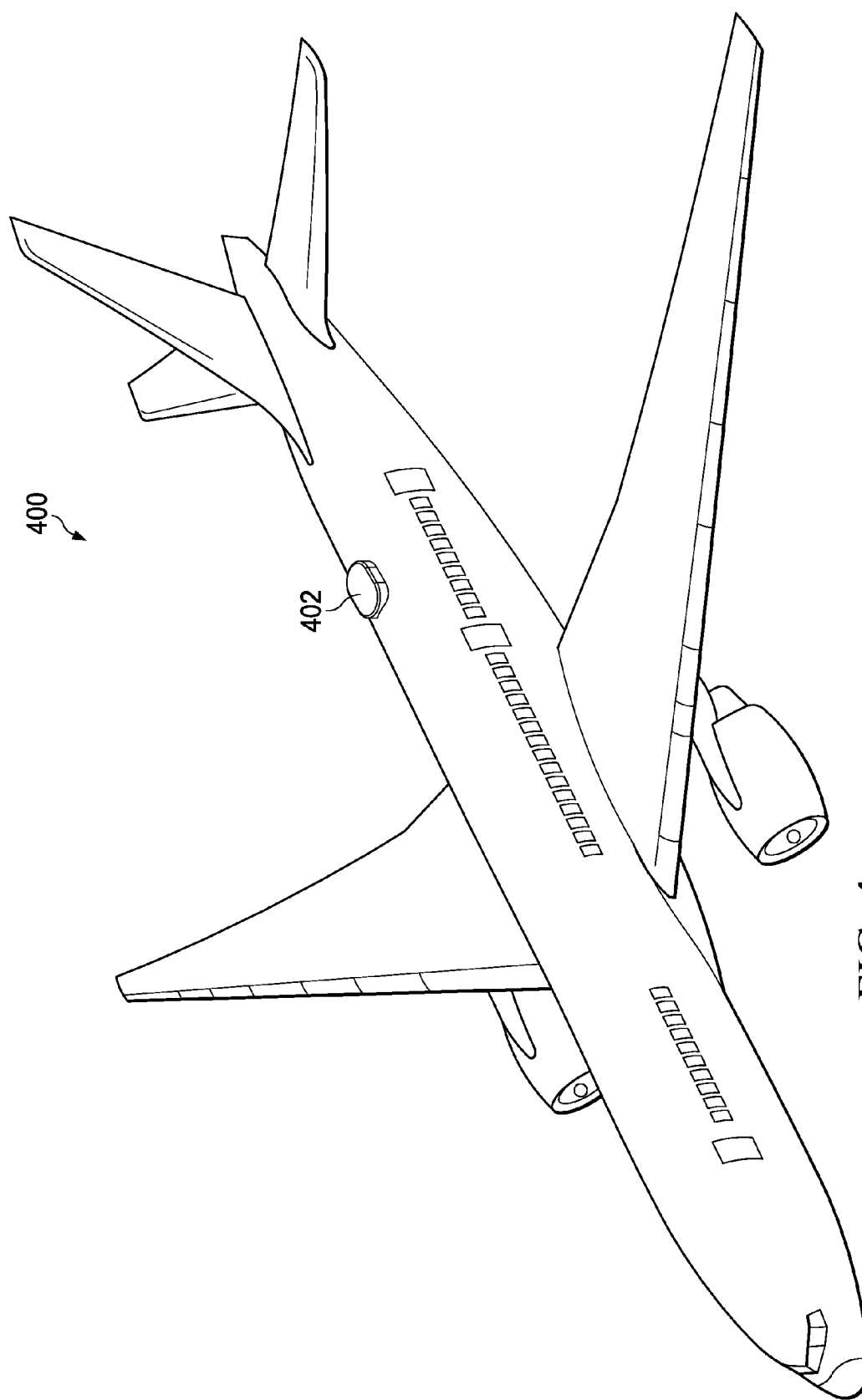
FIG. 4 is an illustration of an aircraft depicted in accordance with an advantageous embodiment.

Turning to FIG. 4, an illustration of an aircraft is depicted in accordance with an advantageous embodiment. Aircraft 400 may be one example of one implementation of aircraft 304 in FIG. 3. Aircraft 400 may include radome 402. Radome 402 may be one example of one implementation of radome 315 in FIG. 3. In these advantageous embodiments, radome 402 appears on top of aircraft 400 near the back of aircraft 400. However, in different advantageous embodiments, radome 402 may be placed in different spots on aircraft 400 such as, but not limited to, the nose or tail of aircraft 400.

Figure 5:
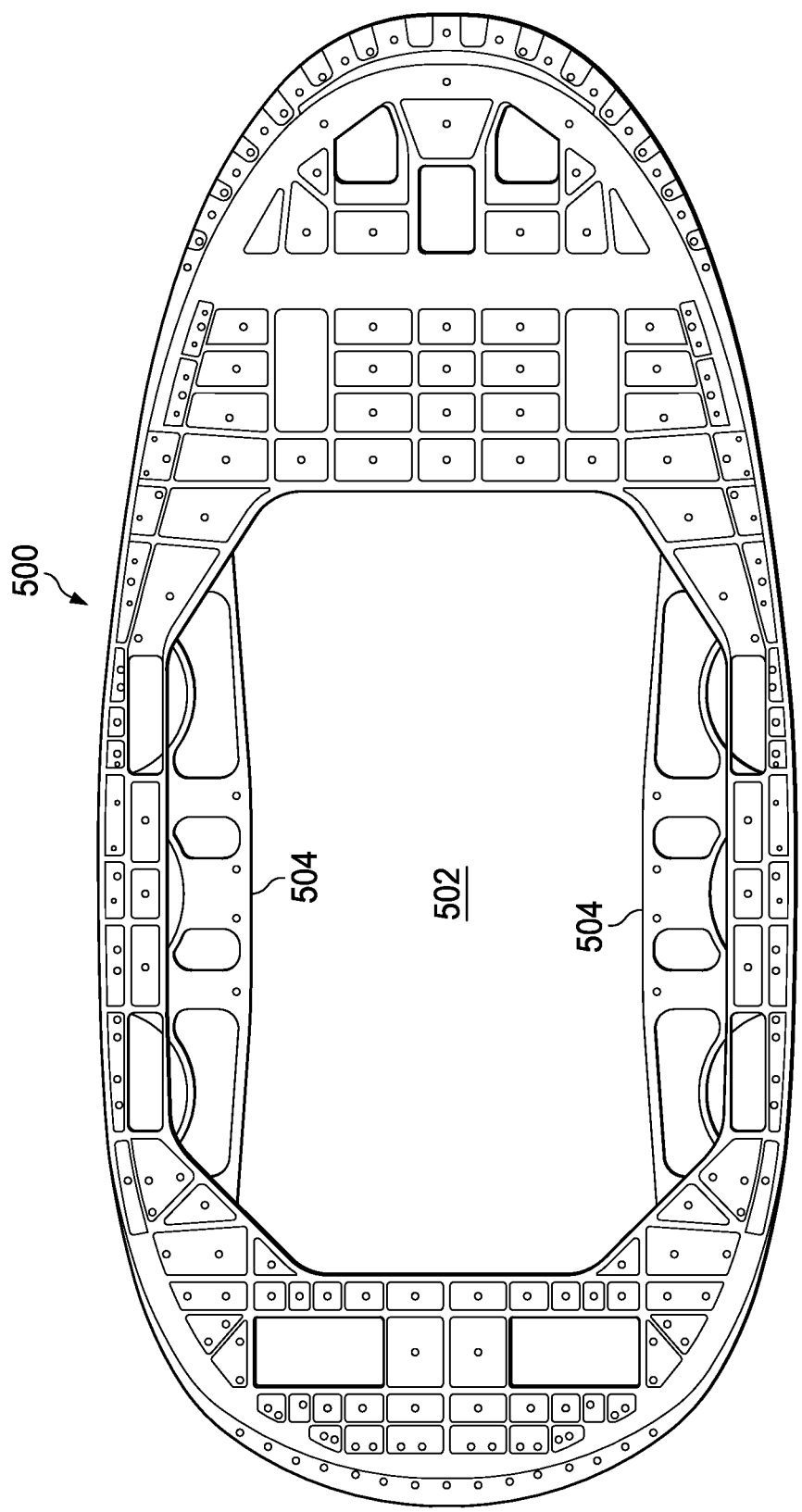
FIG. 5 is an illustration of a radome attachment plate depicted in accordance with an advantageous embodiment.

Turning to FIG. 5, an illustration of an antenna system is depicted in accordance with an advantageous embodiment. Radome attachment plate 500 may be one example of one implementation of aircraft planar member 318 in FIG. 3. Radome attachment plate 500 may include opening 502. Opening 502 may be one example of one implementation of opening 326 in FIG. 3. In these advantageous embodiments, support members 504 may be attached to radome attachment plate 500 at opening 502. Support members 504 may be one example of one advantageous embodiment of support members 328 in FIG. 3.

Figure 6:
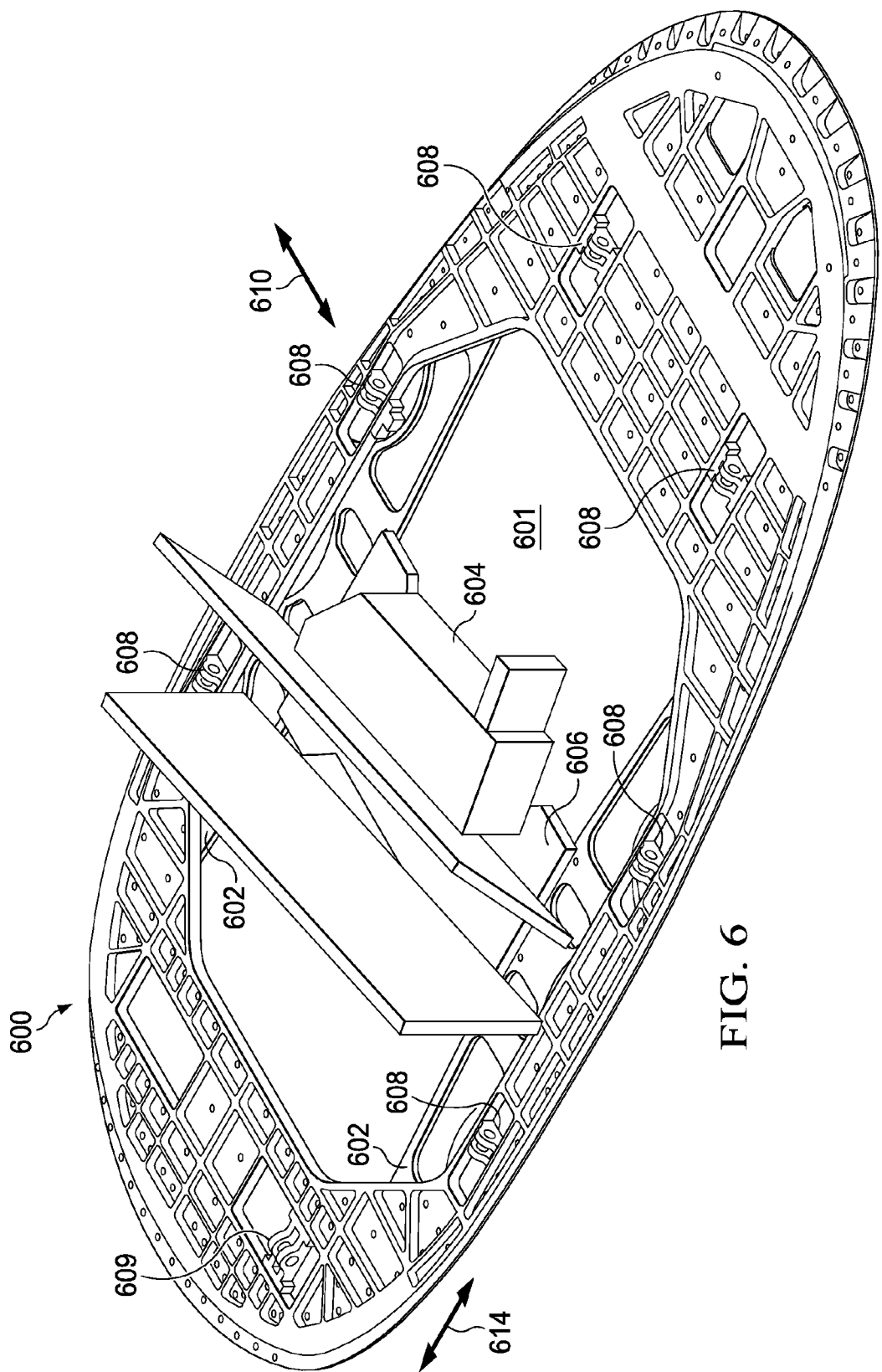
FIG. 6 is an illustration of an antenna attached to a number of support members depicted in accordance with an advantageous embodiment.

Turning to FIG. 6, an illustration of an antenna attached to a number of support members is depicted in accordance with an advantageous embodiment. Radome attachment plate 600 may be one example of one implementation of aircraft planar member 318 in FIG. 3. Radome attachment plate 600 may include opening 601. Opening 601 may be one example of one implementation of opening 326 in FIG. 3. In these advantageous embodiments, support members 602 may be attached to radome attachment plate 600 at opening 601. Support members 602 may be one example of one implementation of support members 328 in FIG. 3.

Antenna 604 may be attached to support members 602 by base 606. Base 606 may be part of antenna 604. In different advantageous embodiments, antenna 604 may not have a base and may be directly attached to support members 602. In different advantageous embodiments, base 606 may be larger and directly attach to radome attachment plate 600.

Connectors 608 and 609 may be one example of one implementation of connectors 320 in FIG. 3. Connectors 608 and 609 may be swing links. Swing links may allow the connectors to pivot. Pivoting may reduce the forces applied to radome attachment plate 600 by an attached structure, such as an airframe of an aircraft. Connectors 608 and 609 may absorb the forces.

Connectors 608 may pivot in direction 610. Connectors 609 may pivot in direction 614. The connectors in this figure may be a representation of what types of connectors may be used and where they may be placed. In different advantageous embodiments, different connectors may be used, more or less connectors may be used, and the connectors may be positioned in different places.

Figure 7:
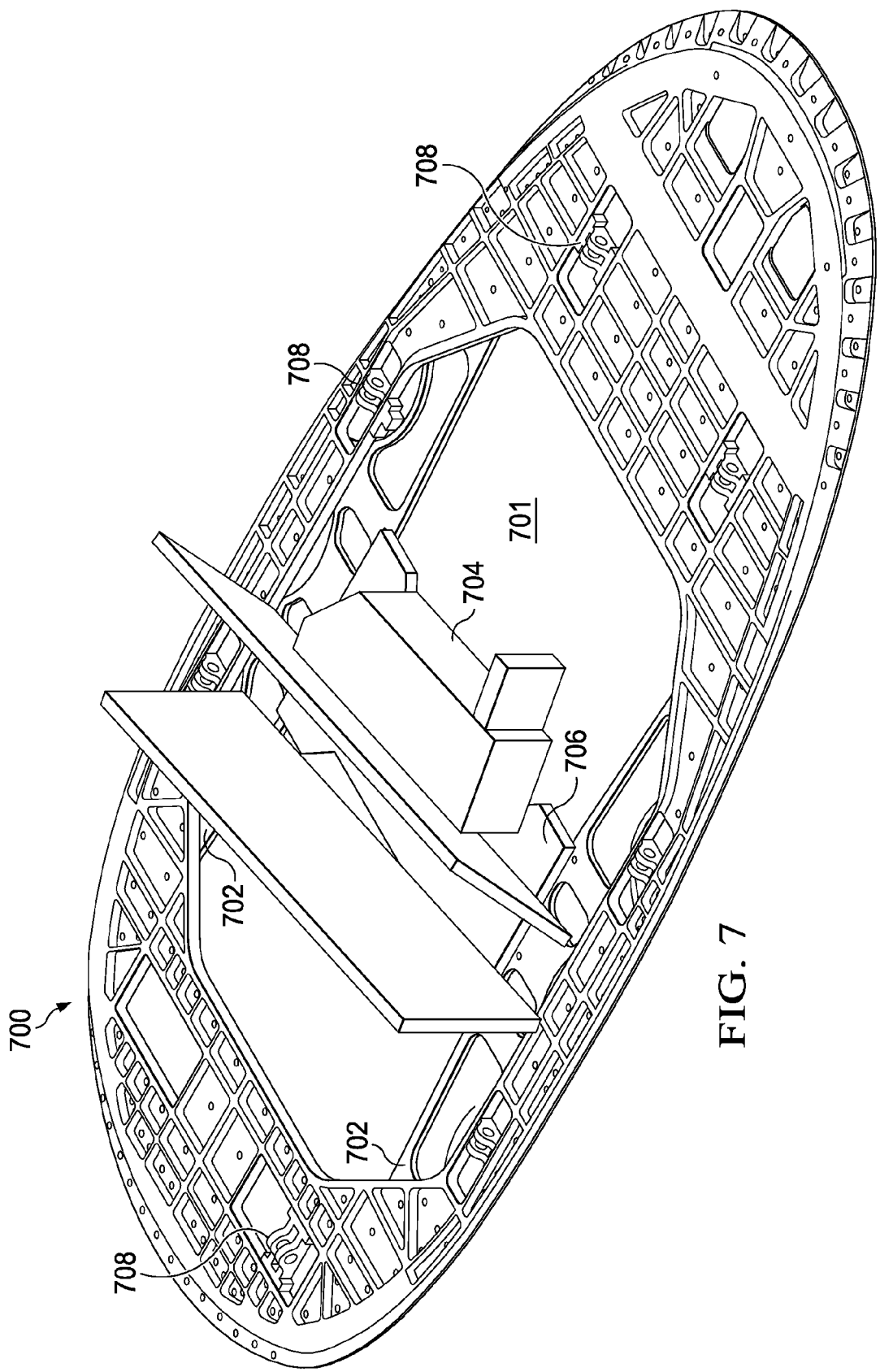
FIG. 7 is an illustration of an antenna attached to a number of support members as part of a planar member depicted in accordance with an advantageous embodiment.

Turning to FIG. 7, an illustration of an antenna attached to a number of support members as part of a planar member is depicted in accordance with an advantageous embodiment. Radome attachment plate 700 may be one example of an implementation of aircraft planar member 318 in FIG. 3. Radome attachment plate 700 may include opening 701. Opening 701 may be one example of one implementation of opening 326 in FIG. 3. In these advantageous embodiments, support members 702 may be part of radome attachment plate 700 at opening 701. Support members 702 may be one example of one implementation of support members 328 in FIG. 3. Support members 702 may be manufactured as part of radome attachment plate 700.

Antenna 704 may be attached to support members 702 by base 706. Base 706 may be part of antenna 704. In different advantageous embodiments, antenna 704 may not have a base and may be directly attached to support members 702. In different advantageous embodiments, base 706 may be larger and directly attach to radome attachment plate 700.

Connectors 708 may be one example of one implementation of connectors 320 in FIG. 3. Connectors 708 may be swing links. Swing links allow the connectors to pivot. Pivoting may reduce the forces applied to radome attachment plate 700 by an attached structure, such as an airframe of an aircraft. Connectors 708 may absorb the forces.

Figure 8:
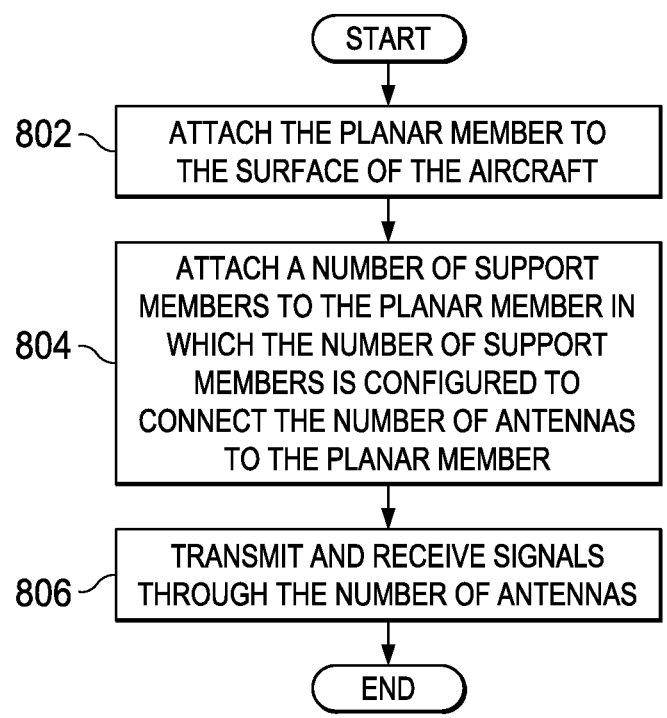
FIG. 8 is an illustration of a flowchart illustrating a process for associating an antenna with an aircraft depicted in accordance with an advantageous embodiment.

With reference now to FIG. 8, an illustration of a flowchart illustrating a process for associating an antenna with an aircraft is depicted in accordance with an advantageous embodiment. The process in FIG. 8 may be implemented by a component such as antenna environment 300 in FIG. 3, for example.

The process may begin by attaching the planar member 318 to the airframe 306 of the aircraft 304 (operation 802). Operation 802 may comprise the process of attaching the planar member 318 to the airframe 306 of the aircraft 304 using a number of connectors 320 configured to reduce a change 322 in a shape 324 of the planar member 318 in response to a change 314 in a shape 312 of airframe 306 of the aircraft 304. The planar member 318 may have an opening 326 configured to receive the number of antennas 316.

The process may also attach a number of support members 328 to the planar member 318 in which the number of support members 328 may be configured to connect the number of antennas 316 to the planar member 318 (operation 804). The number of support members 328 may be fastened to the planar member 318.

The number of support members 328 may be configured to reduce contact of the number of antennas 316 to the airframe 306 of the aircraft 304. Additionally, the number of support members 328 may be configured to reduce a number of hard points. The process may also transmit and receive signals through the number of antennas 316 (operation 806). Thereafter, the process terminates.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus comprising a planar member and a number of support members. The planar member may be configured to be attached to an airframe of an aircraft. The number of support members may be attached to the planar member. The number of support members may be configured to connect a number of antennas to the planar member.

The different advantageous embodiments may provide a reduction in the number of hard points on an aircraft. The antenna does not become a hard point because the antenna is attached to the radome attachment plate and not the airframe of the aircraft. Reducing the number of hard points may reduce weight of the aircraft. the weight may be reduced by reducing the reinforcements of the hard points. Reducing the number of hard points also may reduce the cost of the aircraft.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a planar member configured to be attached to an airframe of an aircraft and having an opening configured to receive a number of antennas;
   a number of support members connected to the planar member at the opening, wherein the number of support members is configured to connect the number of antennas to the planar member; and
   a number of swing links configured to attach the planar member to the airframe of the aircraft, wherein the swing links are configured to reduce a change in a shape of the planar member in response to a change in a shape of the airframe of the aircraft, and wherein the swing links pivot to reduce a number of forces applied to the planar attachment member by the airframe.

2. The apparatus of claim 1, wherein the number of support members is configured to reduce contact of the number of antennas to the airframe of the aircraft when the planar member is attached to hard points on the airframe.

3. The apparatus of claim 1 further comprising:
the aircraft with the airframe; and
the number of antennas configured to receive and transmit signals.

4. The apparatus of claim 1, wherein the number of support members is configured such that the number of antennas do not become hard points on the airframe when the planar member is attached to the airframe.

5. The apparatus of claim 1, wherein the number of support members are part of the planar member and not attached to the planar member.

6. The apparatus of claim 1,
wherein the number of antennas do not become a hard point because the antenna is attached to the planar member and not the airframe of the aircraft;
wherein the swing links absorb the forces; and
wherein the planar member is a radome attachment plate.

7. A system for associating a number of antennas with an aircraft comprising:
an aircraft with an airframe;
a planar member configured to be attached to the airframe of the aircraft in which the planar member has an opening configured to receive the number of antennas;
a number of support members in the opening of the planar member in which the number of support members is configured to connect to the number of antennas to the planar member; and
a number of swing links configured to attach the planar member to the airframe of the aircraft, wherein the swing links are configured to reduce a change in a shape of the planar member in response to a change in a shape of the airframe of the aircraft, and wherein the swing links pivot to reduce a number of forces applied to the planar attachment member by the airframe.

8. The system of claim 7, wherein the number of support members is configured such that the number of antennas do not become hard points on the airframe when the planar member is attached to the airframe.

9. The system of claim 7, wherein the number of support members is fastened to the planar member.

10. The system of claim 7, wherein the number of support members is configured to reduce a contact of the number of antennas to the airframe of the aircraft when the planar member is attached to the airframe.

11. The system of claim 7 further comprising:
the number of antennas configured to receive and transmit signals.

12. A method for associating a number of antennas with an aircraft, comprising:
attaching a planar member to an airframe of an aircraft, wherein the planar member has an opening configured to receive the number of antennas;
attaching a number of support members to the planar member at the opening, wherein the number of support members is configured to connect the number of antennas to the planar member; and
attaching the planar member to the airframe of the aircraft using a number of swing links configured to reduce a change in a shape of the planar member in response to a change in a shape of the airframe of the aircraft, wherein the swing links pivot to reduce a number of forces applied to the planar attachment member by the airframe.

13. The method of claim 12, wherein the number of support members is configured such that the number of antennas do not become hard points on the airframe when the planar member is attached to the airframe.

14. The method of claim 12 further comprising:
transmitting and receiving signals through the number of antennas.

* * * * *